United States Patent [19]

Lymburner

[11] 4,396,183

[45] Aug. 2, 1983

[54] POWER ACTUATED CLAMP

[76] Inventor: Robert K. Lymburner, 4075 Clinton River Dr., Clinton River Mobile Park, Mt. Clemens, Mich. 48043

[21] Appl. No.: 376,402

[22] Filed: May 10, 1982

[51] Int. Cl.[3] .............................................. B23Q 3/08

[52] U.S. Cl. ........................................ 269/32; 269/93; 269/233; 269/228

[58] Field of Search .................... 269/31, 32, 228, 233, 269/93; 74/106

[56] References Cited

U.S. PATENT DOCUMENTS 3,347,542 10/1967 Mericle .............................. 269/228

3,565,415 2/1971 Blatt ...................................... 269/32

3,724,837 4/1973 McPherson .......................... 269/32

FOREIGN PATENT DOCUMENTS 709285 5/1954 United Kingdom ................ 269/228

*Primary Examiner*—Robert C. Watson

*Attorney, Agent, or Firm*—Basile, Weintraub & Hanlon

[57] ABSTRACT

A power actuated workpiece clamp includes a clamping arm actuated by linear movement of a powered actuator member via a compound linkage. The linkage is such that the arm is maintained in the clamping position by a linkage geometer wherein three pivots of the compound linkage lie in a common plane aligned with the line of action of the force urging the clamp arm to its open position.

3 Claims, 4 Drawing Figures

POWER ACTUATED CLAMP

BACKGROUND OF THE INVENTION

The present invention is directed to a power actuated clamp of the type employed in production line operations to repetitively clamp like workpieces in position upon a jig or fixture. Power actuated clamps of this general type are known in the art; see, for example, U.S. Pat. No. 3,116,058.

The present invention is especially directed to improvements in such clamps which achieve a uniform and positively maintained clamping force while at the same time accommodating a rapid release of the clamp.

SUMMARY OF THE INVENTION

In accordance with the present invention, a clamping member is pivotally mounted upon a stationary housing and is driven in movement between its clamping and released position by a power driven actuating member, such as a piston rod, which is coupled to the clamping arm via a compound linkage arrangement. The linkage arrangement finds two links pivotally connected in series to the clamping member with a pin projecting from that end of the linkage system remote from the clamping member being guided within a slot in the housing. The pivot coupling these two links to each other also pivotally connects a third link to this midpoint, the opposite end of the third link being pivotally coupled to the actuating member which, in the usual case, is the rod of a piston. When the clamping device is in its clamping position, the two links connected in series to the clamping member are disposed in a straight line relationship, with the pin, intermediate pivot and pivot connecting the links to the clamping member all lying in a common plane which is normal to the straight line direction of movement of the actuating member. At this time, the pivot pin at the end of the linkage chain remote from the clamping member is seated at the bottom of a downwardly inclined section of the guiding groove in the housing wall; thus, forces acting in a direction tending to open the clamp are confined to the plane of the three pivots referred to above and merely tend to seat the pivot pin at the bottom of the guiding groove. At this time, the link connecting the actuating member to the intermediate pivot is in a slightly overcentered position; thus the linkage is effectively locked in the clamping position.

Upon subsequent unclamping of the assembly, by retraction of the actuating member, the initial movement tends to hold the pivot pin seated at the bottom of its guide slot, thus requiring the two links in straight line to rapidly "break" from their straight line position upon the commencement of the opening of the clamp.

Other objects and features of the invention will become apparent by reference to the following specification and to the drawings.

IN THE DRAWINGS

Figure 1:
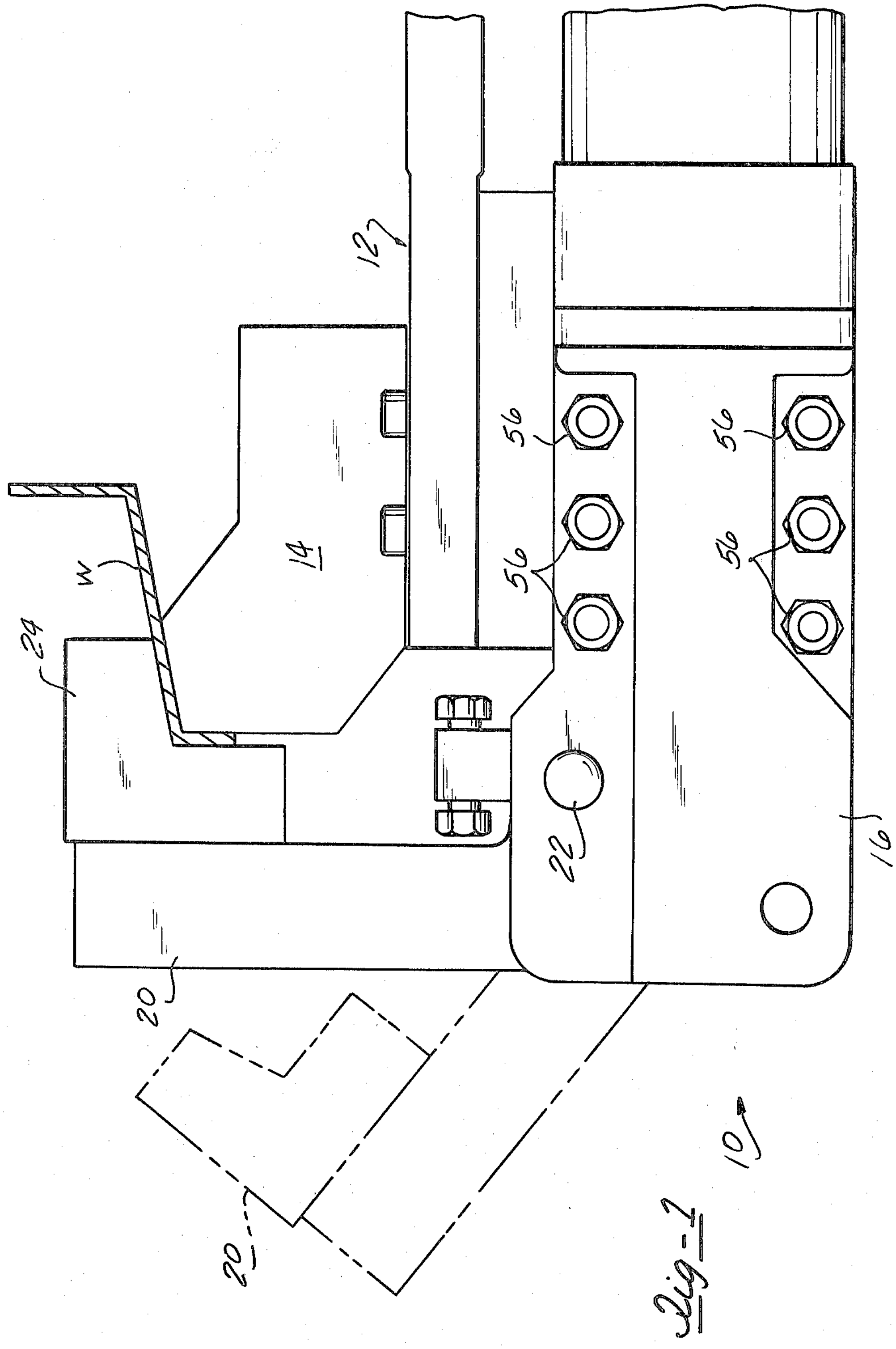
FIG. 1 is a side elevational view, with certain parts broken away or shown in section, of a power actuated clamp embodying the present invention.

Referring first to FIG. 1, a clamp assembly designated generally 10 embodying the present invention is shown as being fixedly mounted upon a fixture designated generally 12 which includes a stationary jaw 14 suitably conformed to the shape of a workpiece W which is to be clamped upon the fixture by the clamping assembly 10. Clamp assembly 10 includes a housing 16 having an actuating cylinder-piston assembly of conventional construction designated generally 18 fixedly mounted at one end of the housing.

A clamp arm 20 is mounted within housing 16 for pivotal movement about a pin 22 fixedly located in the housing. At its outer end, clamp arm 20 carries a suitably shaped jaw 24 which, when the clamping device is in the clamping position shown in full line in FIG. 1, releasably clamps the workpiece W against the fixed clamping jaw 14 of fixture 12. Clamp arm 20 is movable, by a linkage arrangement to be described below, to the released position indicated in broken line in FIG. 1.

Figure 2:
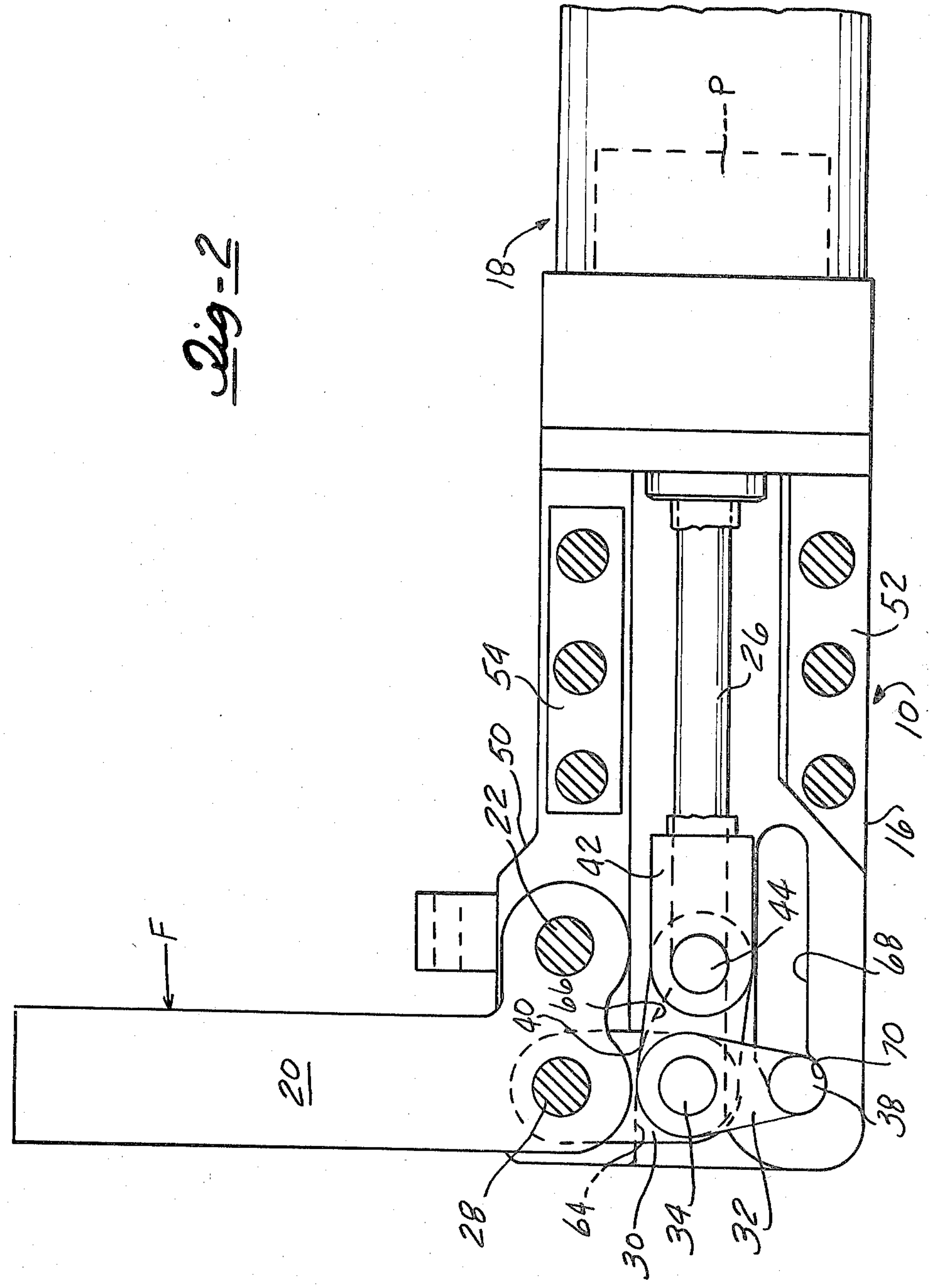
FIG. 2 is a side elevational view of the clamp assembly shown in FIG. 1, with certain portions of the clamp housing removed.

Referring now to FIG. 2, there is shown a side elevational view of the clamp assembly 10 per se with one side of housing 16 removed to expose the piston rod of actuator 18 and a linkage arrangement which interconnects the rod 26 to clamp arm 20.

Clamp arm 20, in the particular embodiment shown, is in the form of a bell crank pivotally mounted at one end on the stationary pivot 22 mounted on housing 16. A pivot 28 pivotally couples clamp arm 20 to a first link 30, pivot 28 being at a location on clamp arm 20 which is spaced from pivot 22. The opposite end of link 30 is connected to a second link assembly 32 by a pivot 34.

Figure 4:
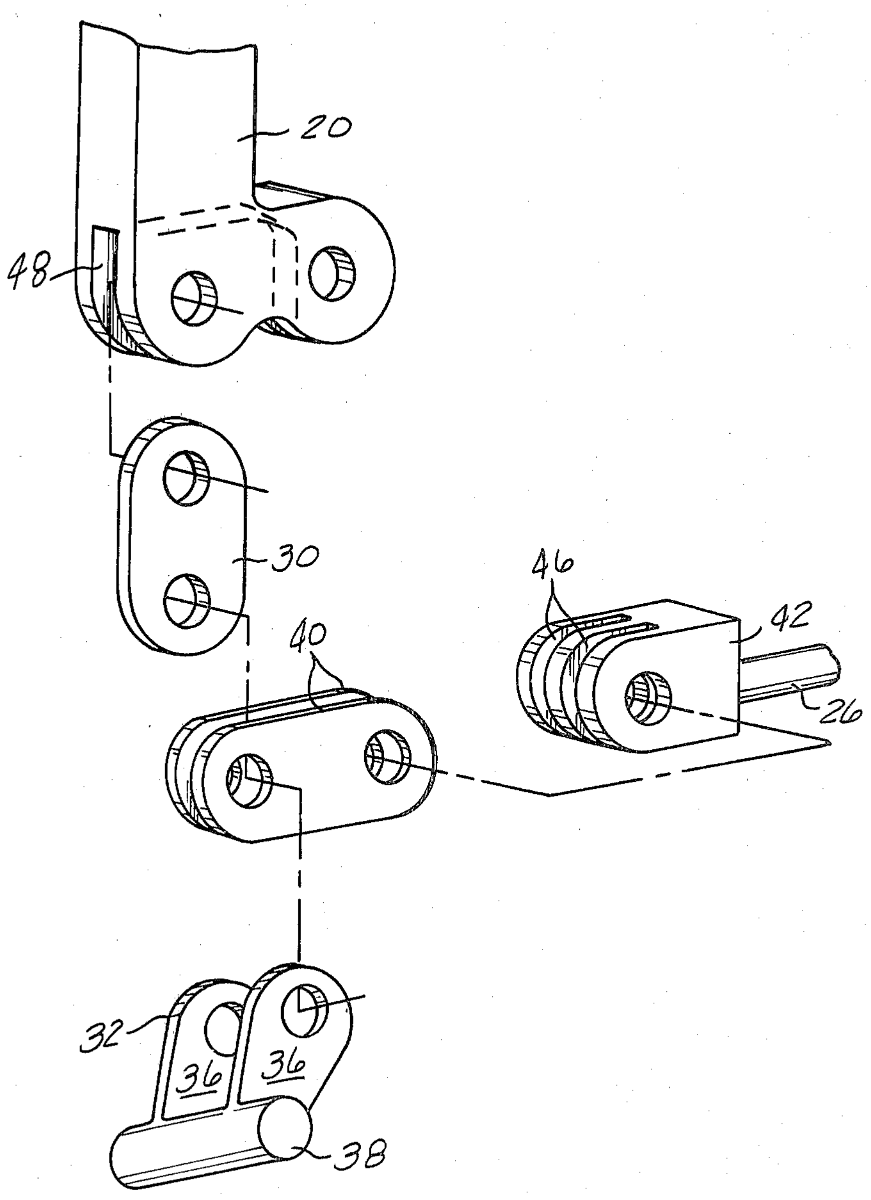
FIG. 4 is an exploded perspective view of the linkage of the clamp of FIG. 1.

As best seen in FIG. 4, link assembly 32 consists of a pair of parallel arms 36 which are fixedly secured to each other in spaced parallel relationship by a transversely extending pivot pin 38 fixedly secured to the arms 36 and projecting transversely beyond the opposite sides of the arms.

A pair of like links 40 are pivotally mounted at one end upon pivot pin 34 and are pivotally connected at their opposite ends to a mounting block 42 by a pivot pin 44. Mounting block 42 is fixedly mounted on the end of actuating rod 26.

As best seen in FIG. 4, the two links 40 are received within spaced parallel slots 46 in mounting block 42, the spacing between slots 46 being such that the link 30 can be loosely received between the opposed ends of the two links 40. The transverse spacing between the arms 36 of link assembly 32 is such that the two links 40, with the link 30 received therebetween, can be received between the two arms 36. A slot 48 in clamp arm 20 receives the upper end of link 30.

Figure 3:
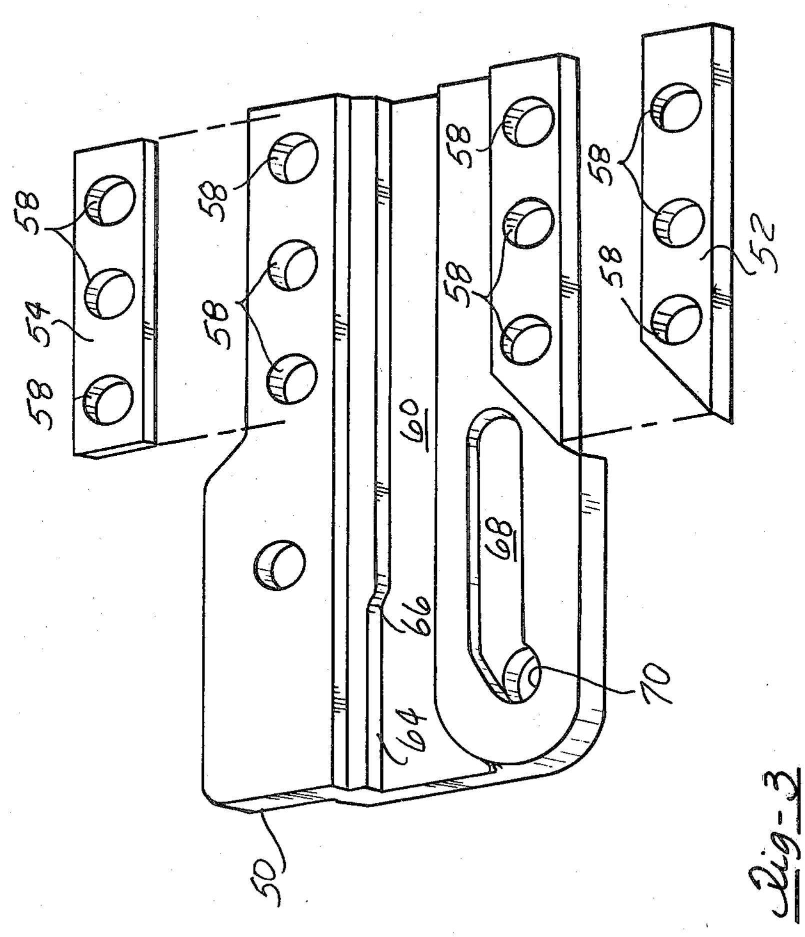
FIG. 3 is a perspective view of one side of the housing of the clamp of FIG. 1, together with a spacer member.

Referring now to FIG. 3, housing 16 may conveniently be made up of a pair of side plates 50. Only one of side plates 50 is shown in FIG. 3, the opposite side plate being a mirror image of the plate 50 shown. A pair of spacer blocks 52, 54 are sandwiched, in assembly, between the opposed plates 50 (see FIG. 2), the plates and spacer blocks being held in assembled relationship as by bolts 58 (FIG. 1) which pass through aligned bores 58 in the housing elements.

Returning to FIG. 3, the inner surface of each side plate 50 is formed with a relatively deep, longitudinally extending groove 60. Along the upper edge of groove 60, a slightly elevated shoulder 62 is formed whose undersurface includes an elevated portion 62 at that end portion of groove 60 remote from the actuating motor which, at it inner end, merges into a downwardly gooved cam portion 66, see also FIG. 2. When the housing is assembled, the two side plates 50 are spaced from each other by a distance such that the mounting block 42 at the end of piston rod 26 can move freely between the opposed surfaces 62 of the opposed side plates 50, while the pivot pin 34 projects outwardly beyond the opposed sides of link assembly 32 by a distance sufficient to engage and slide along the undersurfaces 64, 66 of shoulders 62.

Located below groove 60 is a guide slot 68 whose major portion extends parallel to groove 60 and merges at its outer (left as viewed in FIG. 3) end with a relatively short, downwardly inclined portion 68. The projecting ends of pin 38 of link assembly 32 are slidably received and retained within guide slots 68 when the housing is assembled.

Referring now to FIG. 2, the clamp assembly is there shown in its clamped position, with the piston P of the actuator motor 18 at its extreme left-hand limit of travel and piston rod 26 fully extended. Clamp arm 20 in FIG. 2 is shown positioned in the clamping position illustrated in FIG. 1. Returning to FIG. 2, it will be seen that when clamping arm 20 is in the clamping position, the pivotal axes of pivots 28, 34 and pivot pin 38 all lie in a straight line or a common plane which is in turn perpendicular to the straight line path of movement of piston rod 26. Pin 38 is at this time firmly seated in the lower ends of inclined portions 70 of guide slots 68. It will be noted at this time that the pivot pin 44 which connects links 40 to the piston rod is disposed slightly below the elevation of pivot pin 34 at the opposite end of links 40.

With the parts in the position shown in FIG. 2, the clamping force applied by the assembly acts against a reactive force indicated at the arrow F in FIG. 2 tending to open the clamp. This reactive force would tend to swing clamp arm 20 in a counterclockwise direction about the axis of pivot pin 22 as viewed in FIG. 2; however, by virtue of the fact that the axes of pivot pins 28 and 22 lie in a plane normal to that containing pivots 28, 34 and 38, movement of the clamp can occur only if one of these latter pivots can move downwardly. Downward movement of any of these latter three pivots is prevented by the fact that at this time the projecting pivot pin 38 on link assembly 32 is engaged in and seated against the bottom of inclined portion 70 of guide slot 68 recessed into the inner surface of the side plates 50. Thus, clamp arm 20 is positively locked in the clamping position shown in FIGS. 1 and 2.

To release the clamping action, the piston P of actuator 18 is driven to the right, by control means well known in the art, to retract piston rod 26. As piston rod 26 moves to the right as viewed in FIG. 2, it draws with it pivot pin 44 and hence the two links 40, this action requiring pivot pin 34 and the various ends of the links engaged thereby to the right as viewed in FIG. 2. The initial movement of pivot pin 34 to the right causes link assembly 32 to swing in clockwise movement about the axis of pin 38 as viewed in FIG. 2, this initial movement immediately breaking the straight line or coplanar relationship of the three pivot axes 38, 34 and 28. This clockwise pivotal movement of link assembly 32 about the axis of pin 38 causes pivot pin 34 to both move to the right and to move downwardly as viewed in FIG. 2, this downward movement of pivot pin 34 requiring a similar downward movement of pivot pin 28 about the axis of pin 22, thereby immediately commencing opening movement of the clamping arm. Further movement of the piston rod to the right as viewed in FIG. 2 eventually moves the projecting portions of pivot pin 34 into contact with the downwardly curved portion 66, this camming action tending to retain pivot pin 38 at the downwardly inclined bottom of section 68 of its guide slot until clamp arm 20 has been substantially retracted from its clamping position.

Further movement of piston rod 26 to the right as viewed in FIG. 2 will eventually carry pivot pin 38 up inclined portions 68 of guide slot 70 and draw it along the horizontal portion of slot 70 as the piston rod approaches its fully retracted position. At full retraction, the projecting end of clamp arm 20 may be displaced over 90 degrees from the position shown in FIG. 2.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A clamp assembly comprising a housing, a power driven actuator member mounted for forward and return movement in said housing along a straight line path between first and second end limits, a clamp arm mounted at one end on said housing for pivotal movement relative to said housing about a fixed first axis normal to and offset from said straight line path, first link means coupled at one end to said arm for pivotal movement relative to said arm about a second axis parallel to and spaced from said first axis, second link means, a pivot pin pivotally interconnecting one end of said second link means to the other end of said first link means for pivotal movement about a third axis parallel to said first axis, a guide pin having an axis parallel to said third axis mounted upon and projecting outwardly from opposite sides of said second link means at the other end thereof, means on said housing defining a pair of opposed guide slots respectively slidably receiving the projecting portions of said guide pin to guide movement of said other end of said second link means relative to said housing along a second path offset from said straight line path at the side thereof remote from said second axis while accommodating pivotal movement of said second link means relative to said housing about the axis of said guide pin, and third link means pivotally connected at one end to said pivot pin and coupled at its other end to said actuator member for pivotal movement about a fourth axis normal to and intersecting said straight line path, said actuator member when at said first end limit locating said guide pin at one end of said second path with the axis of said guide pin, said second axis and said third axis lying in a common plane normal to said straight line path and to a plane containing said first and said second axes.

2. The invention defined in claim 1 wherein said second path includes a first section inclined from said one end thereof toward said straight line path for a relatively short distance, a second section of said second path extending from said first section in parallel, offset relationship to said straight line path to the opposite end of said second path.

3. The invention defined in either of claims 1 and 2 wherein said third axis is located between a projection of said straight line path and said second axis when said actuator member is at said first end limit.

* * * * *